(12) United States Patent
Aleksov et al.

(10) Patent No.: US 11,095,012 B2
(45) Date of Patent: Aug. 17, 2021

(54) METHODS FOR CONDUCTIVELY COATING MILLIMETER WAVEGUIDES

(71) Applicant: Intel Corporation, Santa Clara, CA (US)

(72) Inventors: Aleksandar Aleksov, Chandler, AZ (US); Georgios C. Dogiamis, Chandler, AZ (US); Telesphor Kamgaing, Chandler, AZ (US); Sasha N. Oster, Chandler, AZ (US); Adel A. Elsherbini, Chandler, AZ (US); Shawna M. Liff, Scottsdale, AZ (US); Johanna M. Swan, Scottsdale, AZ (US); Brandon M. Rawlings, Chandler, AZ (US); Richard J. Dischler, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/329,587

(22) PCT Filed: Sep. 30, 2016

(86) PCT No.: PCT/US2016/054977
§ 371 (c)(1),
(2) Date: Feb. 28, 2019

(87) PCT Pub. No.: WO2018/063388
PCT Pub. Date: Apr. 5, 2018

(65) Prior Publication Data
US 2019/0198961 A1 Jun. 27, 2019

(51) Int. Cl.
*H01P 3/16* (2006.01)
*H01P 11/00* (2006.01)
(Continued)

(52) U.S. Cl.
CPC ............... *H01P 3/16* (2013.01); *H01P 3/122* (2013.01); *H01P 11/002* (2013.01);
(Continued)

(58) Field of Classification Search
CPC .......... H01P 3/16; H01P 11/002; H01P 3/122; H01P 11/006; H01Q 9/045; H04L 67/10
(Continued)

(56) References Cited

U.S. PATENT DOCUMENTS 3,761,845 A * 9/1973 Ajioka .................... H01P 1/195
333/24.1
4,220,955 A * 9/1980 Frye ........................ H01P 1/045
343/703
(Continued)

FOREIGN PATENT DOCUMENTS

JP         2005203884 A     7/2005
WO    WO-2018063388 A1     4/2018

OTHER PUBLICATIONS

"International Application Serial No. PCT/US2016/054977, International Search Report dated Apr. 25, 2017", 3 pgs.
(Continued)

*Primary Examiner* — Don P Le
(74) *Attorney, Agent, or Firm* — Schwegman Lundberg & Woessner, P.A.

(57) ABSTRACT

A method of forming a waveguide comprises forming an elongate waveguide core including a dielectric material; and arranging a conductive sheet around an outside surface of the dielectric core to produce a conductive layer around the waveguide core.

12 Claims, 4 Drawing Sheets

(51) Int. Cl.
    *H01P 3/12*     (2006.01)
    *H01Q 9/04*     (2006.01)
    *H04L 29/08*     (2006.01)

(52) U.S. Cl.
    CPC ........... *H01P 11/006* (2013.01); *H01Q 9/045* (2013.01); *H04L 67/10* (2013.01)

(58) Field of Classification Search
    USPC .......................................................... 343/905
    See application file for complete search history.

(56) References Cited

U.S. PATENT DOCUMENTS

| | | | | |
|---|---|---|---|---|
| 4,230,924 | A * | 10/1980 | Brastad | B65D 81/3446 219/730 |
| RE34,683 | E * | 8/1994 | Maynard | B65D 81/3446 219/730 |
| 5,448,222 | A * | 9/1995 | Harman | G08B 13/169 340/566 |
| 7,208,684 | B2 * | 4/2007 | Fetterolf, Sr. | H01B 7/225 174/113 R |
| 7,440,660 | B1 * | 10/2008 | Jin | B82Y 10/00 369/112.27 |
| 2009/0187180 | A1 * | 7/2009 | Brannan | A61B 18/18 606/33 |
| 2010/0052827 | A1 | 3/2010 | Schneider et al. | |
| 2010/0315105 | A1 * | 12/2010 | Fornes | C09D 7/62 324/693 |
| 2014/0097917 | A1 | 4/2014 | Shah et al. | |
| 2014/0140091 | A1 * | 5/2014 | Vasylyev | G02B 6/0045 362/606 |
| 2014/0368301 | A1 | 12/2014 | Herbsommer et al. | |
| 2016/0064795 | A1 | 3/2016 | Chang et al. | |
| 2017/0170538 | A1 * | 6/2017 | Morgan | H01P 3/16 |
| 2019/0198961 | A1 * | 6/2019 | Aleksov | H01Q 9/045 |
| 2019/0356033 | A1 * | 11/2019 | Dogiamis | H01P 3/16 |

OTHER PUBLICATIONS

"International Application Serial No. PCT/US2016/054977, Written Opinion dated Apr. 25, 2017", 13 pgs.
"International Application Serial No. PCT US2016 054977, International Preliminary Report on Patentability dated Apr. 11, 2019", 15 pgs.

* cited by examiner

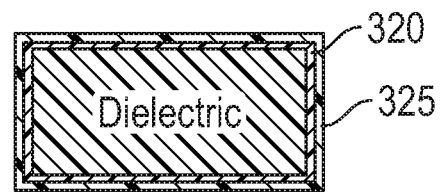
FIG. 3A　　　　　　　FIG. 3B
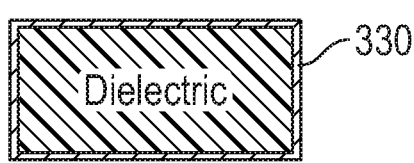
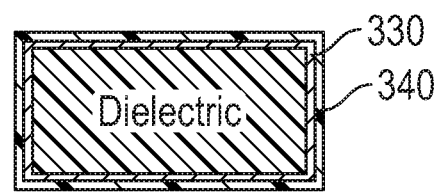
FIG. 3C　　　　　　　FIG. 3D
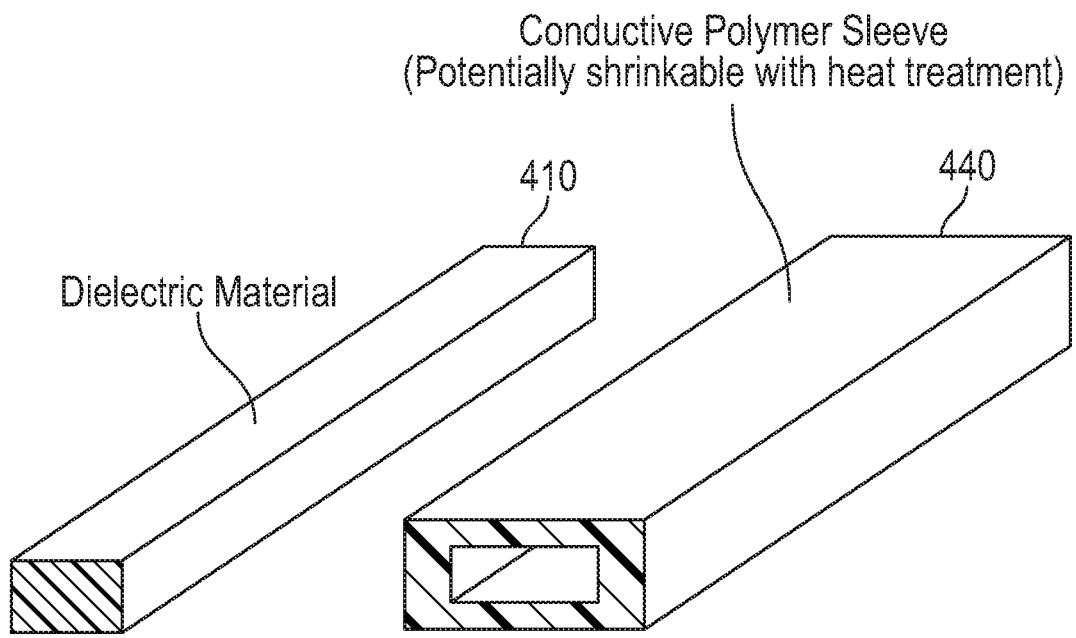
FIG. 4

METHODS FOR CONDUCTIVELY COATING MILLIMETER WAVEGUIDES

PRIORITY APPLICATION

This application is a U.S. National Stage Filing under 35 U.S.C. 371 from International Application No. PCT/US2016/054977, filed on Sep. 30, 2016, and published as WO 2018/063388, which application is incorporated herein by reference in its entirety.

TECHNICAL FIELD

Embodiments pertain to high speed interconnections in electronic systems, and more specifically to waveguides for implementing communication interfaces between electronic devices.

BACKGROUND

As more electronic devices become interconnected and users consume more data, the demand on server system performance continues to increase. More and more data is being stored in internet "clouds" remote from devices that use the data. Clouds are implemented using servers arranged in server clusters (sometimes referred to as server farms). The increased demand for performance and capacity has led server system des to look for ways to increase data rates and increase the server interconnect distance in switching architectures while keeping power consumption and system cost manageable.

Within server systems and within high performance computing architectures there can be multiple levels of interconnect between electronic devices. These levels can include within blade interconnect, within rack interconnect, rack-to-rack interconnect and rack-to-switch interconnect. Shorter interconnect (e.g., within rack and some rack-to-rack) is traditionally implemented with electrical cables (e.g., Ethernet cables, co-axial cables, twin-axial cables, etc.) depending on the required data rate. For longer distances, optical cables are sometimes used because fiber optic solutions offer high bandwidth for longer interconnect distances.

However, as high performance architectures emerge (e.g., 100 Gigabit Ethernet), traditional electrical approaches to device interconnections that support the required data rates are becoming increasingly expensive and power hungry. For example, to extend the reach of an electrical cable or extend the bandwidth of an electrical cable, higher quality cables may need to be developed, or advanced techniques of one or more of equalization, modulation, and data correction may be employed which increases power of the system and adds latency to the communication link. For some desired data rates and interconnect distances, there is presently not a viable solution. Optical transmission over optical fiber offers a solution, but at a severe penalty in power and cost. The present inventors have recognized a need for improvements in the connection between electronic devices.

BRIEF DESCRIPTION OF THE DRAWINGS

FIGS. 3A-3D are illustrations of cross sections of waveguides in accordance with some embodiments;

FIG. 4 is an illustration of components used in making a waveguide in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Traditional electrical cabling may not meet the emerging requirements for electronic systems such as server clusters. Fiber optics may meet the performance requirements, but may result in a solution that is too costly and power hungry.

Figure 1:
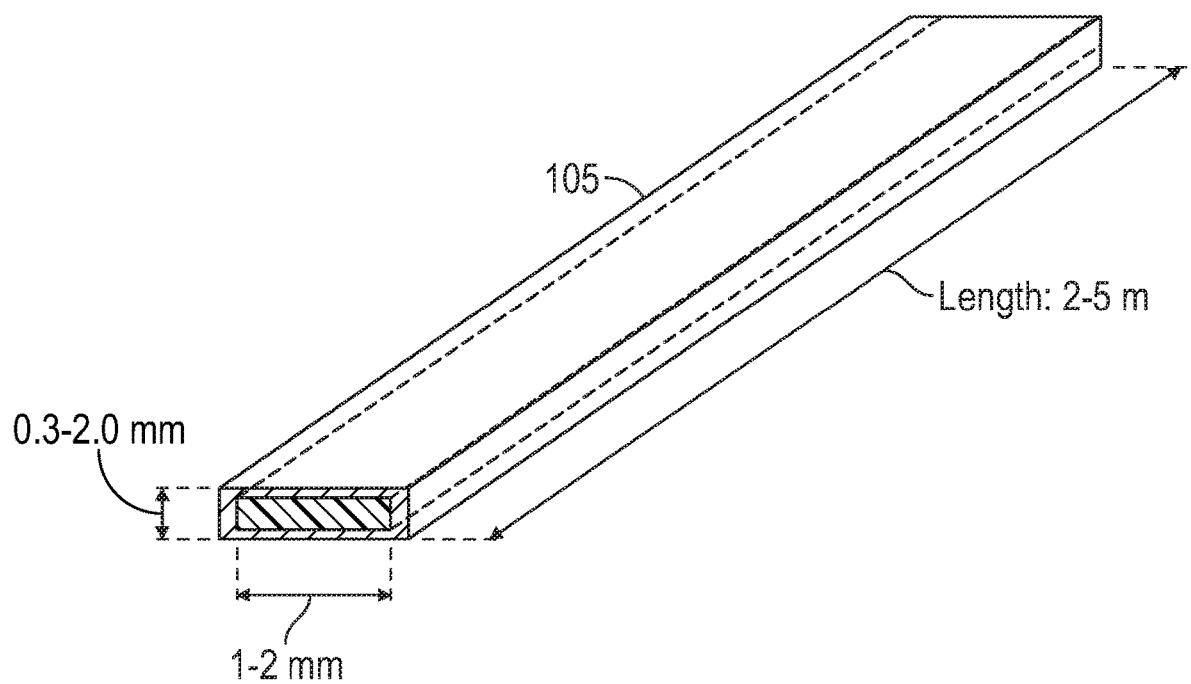
FIG. 1 is an illustration of a waveguide in accordance with some embodiments.

FIG. 1 is an illustration of an embodiment of a waveguide. A waveguide can be used to propagate electromagnetic waves having a wavelength in millimeters (mm) or micrometers (μm). A transceiver end antenna can be used to send electromagnetic waves along the waveguide from the transmitting end. A transceiver at the receiving end can receive the propagated signals using a receiving end antenna. Waveguides offer the bandwidth needed to meet the emerging requirements.

The waveguide 105 may have a length of two to five meters (2-5 m). Electromagnetic waves travel along the length of the waveguide. The cross section of the waveguide may have a height of 0.5-1.0 mm and a width of 1-2 mm. In certain embodiments, the waveguide is dimensioned to carry signals having frequencies of 30 Gigahertz (GHz) to 300 GHz. In certain embodiments, the waveguide is dimensioned to carry signals having frequencies of 100 GHz to 900 GHz. The cross section of the waveguide in FIG. 1 is rectangular, but the cross section may be circular, elliptical, square, or another more complex geometry. The waveguide includes conductive material such as metal. The inside of the waveguide can be hollow and air filled. The conventional methods for manufacturing waveguides are typically complex and expensive. One example is sputtering a metallic layer onto a dielectric core material, which is a costly multi-step manufacturing process. Alternate methods to produce waveguides that are less complex at reduced cost are desired.

Figure 2:
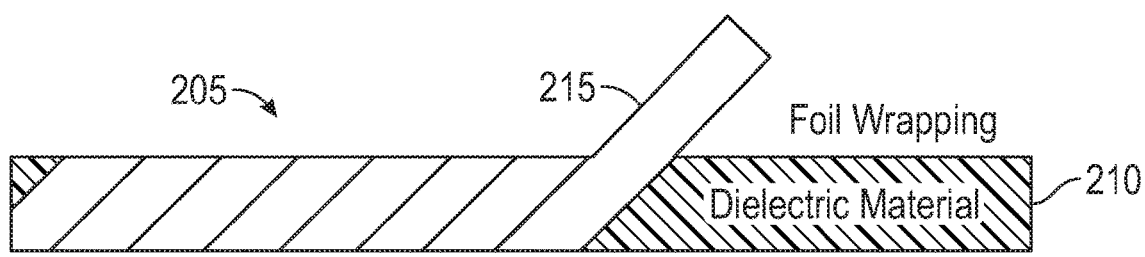
FIG. 2 is an illustration of a method of making a waveguide in accordance with some embodiments.

FIG. 2 is an illustration of an embodiment of a method of making a waveguide 205. The method includes covering a waveguide core with a sheet of conductive material without using a sputtering process. An elongate waveguide core 210 is formed that includes dielectric material. In certain embodiments the waveguide core is formed using one or more of polyethylene (PE), polytetrafluoroethylene (PTFE), perfluoroalkoxy alkanes (PFA), fluorinated ethylene propylene (FEP), polyvinylidene fluoride (PVDF), or ethylene-tetraflouroethylene (ETFE). The dielectric waveguide core may be formed using a drawing process that draws a continuous core from a source material. In some embodiments, the dielectric waveguide core is formed using an extrusion process. In some embodiments, the waveguide core has a solid center. In some embodiments, the waveguide core is formed to have a tubular shape and the center is hollow.

To cover the waveguide core with a conductive layer, tape 215 or ribbon made of a conductive material is wrapped around the outside surface of the dielectric waveguide core to form the conductive sheet around the core. In some embodiments, the tape includes metal and the tape can be a foil ribbon. The metallic tape can include one or more of copper, gold, silver, and aluminum. In some embodiments, the tape includes a conductive polymer, such as a polyaniline (PANI) or poly(3,4-ethylenedioxythiophene) polystyrene sultanate (PEDOT:PSS) for example. The conductive tape wrapped around the waveguide core material may include an adhesive on at least one surface of the conductive tape to provide good adhesion to the waveguide and to the tape itself. The adhesive layer can be very thin (e.g., down to a monolayer of the adhesive material) to minimize impact on the waveguide performance.

The waveguide core 210 may be wrapped as part of a continuous process. The conductive tape may be dispensed from a tape dispensing unit as the dielectric material passes the dispensing unit. One or both of the dielectric core and the dispensing unit may be rotated about the center axis of the waveguide core to spin the tape around the waveguide core. The waveguide core is moved relative to the dispensing unit in a direction along the center axis of the waveguide core as the conductive tape is dispensed. The thickness of the conductive layer can be changed by changing the thickness of the tape or by changing the rate at which one of both of the waveguide core and the dispensing unit are moved. The desired thickness of the conductive layer is determined by the conductivity of the conductive material and the frequency of the signals transported on the waveguide. For electromagnetic wave signals of 100 gigahertz (100 GHz) the skin depth of the wave is about 200 nanometers (nm) in copper and 260 nm in aluminum. Preferably, at least five times the skin depth should be used as the minimum thickness for the conductive sheet. In some embodiments, the thickness of the conductive layer formed by the wrapping is at least one micrometer (1 μm) to 1.3 μm. However, increasing the metal thickness will likely impact the mechanical flexibility of the finished waveguide. After the conductive material is wrapped around the outside surface of the waveguide core, the waveguide may be cut to the desired length. If the tape cannot be tightly wound or an adhesive cannot be used in the waveguide, a heat shrinkable tape can be used in conjunction with a thermal treatment to shrink the tape to provide a tight placement around the waveguide core.

FIGS. 3A-3D are illustrations of some embodiments of a cross section of waveguides. The cross section shown has a rectangular shape, but the cross section need not be rectangular and may be circular, elliptical, square, or another more complex geometry. The waveguides include a conductive layer. In certain embodiments, the conductive coating is 1 μm or greater. In FIG. 3A, the tape includes a conductive polymer 320. Some conductive polymer may need protective coating. In FIG. 3B, the tape includes a conductive polymer 320 paired with a protective polymer 325, which can be added as a jacket or a heat shrink layer for example. The conductive polymer and the protective polymer may be included as multiple layers of the same tape wound around the waveguide core, or the conductive polymer and the protective polymer may be provided as two separate tape layers, wound at the same time or separately. In FIG. 3C, the tape includes metal 330, such as a metallic foil. Some metals (e.g., copper) may be susceptible to oxidation or corrosion, and the metal tape is paired with a protective polymer. In FIG. 3D, the metallic tape or foil is paired with an additional conductive coating, such as a conductive polymer 335. In some embodiments, a braid of metallic foil is added to the waveguide after metallic foil is applied. This may provide good contact at the foil/core interface.

FIG. 4 is an illustration of components used in making a waveguide. In this approach of making a waveguide, a sleeve 440 of conductive material is arranged over the waveguide core 410. The sleeve is then shrink wrapped over the waveguide core (e.g., using a thermal treatment) to form a conductive layer over waveguide core.

The waveguide core 410 may be formed of dielectric material. In some embodiments, the waveguide core is uniformly composed of dielectric material, and in some embodiments the dielectric material of the core is disposed on a non-dielectric material. In some embodiments, the waveguide core has a tubular shape and includes a hollow center. To form a waveguide core with a hollow center, the core may include a sacrificial layer upon which the dielectric material of the core is disposed. An etching material may then be used to remove the sacrificial layer of the center. Holes may formed (e.g., drilled or laser-drilled) into the dielectric material to facilitate etching away of the center. In variations, the holes are formed after the conductive outer layer is placed on the waveguide core. The holes may be oriented and spaced to avoid any interference with wave propagation in the finished waveguide. In further variations, the holes are pre-formed in the sleeve 440 before it is placed around the waveguide core. In other embodiments, a slit may be formed along the dielectric material to facilitate etching away of the center. The center of the core may left hollow (e.g., air filled) or the hollowed center may subsequently be filled with a material different from the sacrificial layer material.

In certain embodiments the sleeve 440 includes a conductive polymer that is placed around the outside surface of the waveguide core. In certain embodiments, the sleeve includes conductive polymer and a protective outer coating placed around the outside surface of the waveguide core as shown in FIG. 3B. In certain embodiments the sleeve includes a metal placed around the outside surface of the waveguide core. In certain embodiments, the sleeve includes metal and a protective outer coating around the outside surface of the waveguide core as shown in FIG. 3D. In some embodiments, the sleeve may have a slit on one side to make arrangement over the waveguide core easier. The waveguide core 410 may be wider at one than the other to facilitate application of the sleeve. When the sleeve is placed over the core, the sleeve is shrink wrapped to provide a tight placement around the waveguide core. If the waveguide core 410 is formed using a drawing process, the sleeve may be placed over the waveguide core as part of the drawing process. The waveguide can be made overly long and then cut to the desired lengths.

Which approach (wound tape or sleeve) is used to form the waveguide conductive sheet may depend on the geometry of the waveguide core. If the waveguide core has a cross section with smooth corners (e.g., a circle or oval) the tape-winding method may be used. If the waveguide core has a cross section that includes corners (e.g., a rectangle or square) the shrink-wrapped approach may be more desirable due to susceptibility of the tape to tearing.

Other approaches can be used to make the waveguide. According to some embodiments, the conductive layer of the waveguide can be formed by applying a liquid or paste that includes a conductive material (e.g., a conductive polymer or a metal) to the outside surface of the waveguide core. In some embodiments, the liquid includes any combination of metallic particles, conductive polymers, and non-metallic conductive particles, such as graphene sheets, carbon nanotubes, and graphite particles. The conductive material can be applied to the waveguide core by immersing the waveguide core into a container of the liquid. The waveguide core may be solid or have a tubular structure. The tubular structure may have a cross section of a circle, oval, rectangle or square. In some embodiments, the waveguide core is drawn through the container of the liquid as part of a drawing process. The coated waveguide core may be dried or heated. In certain embodiments, after the waveguide core is coated with the conductive material, the coated core is sintered to produce the desired conductive properties.

The dielectric core may be fed through different tanks or baths to coat waveguide core with different liquid or paste materials to obtain the desired conductivity and resilience. For example, the waveguide core may be first placed in a tank or bath that applies a primer coating to the waveguide core prior to being placed in a tank or bath that applies the conductive material to the waveguide core. After the conductive material is applied, the waveguide core may be placed in a tank or bath to apply a protective coating to the waveguide core to protect the conductive material from oxidation or humidity.

In other embodiments, the conductive liquid is sprayed onto the waveguide core, or a conductive paste is brushed onto the waveguide core. The waveguide core may be dried or heated at different stages. In certain embodiments, sintering steps may be provided at different stages of coatings. In some variations, sintering can involve a laser or photonic sintering process if the dielectric material of the waveguide core is sensitive to thermal sintering temperatures.

Figure 5:
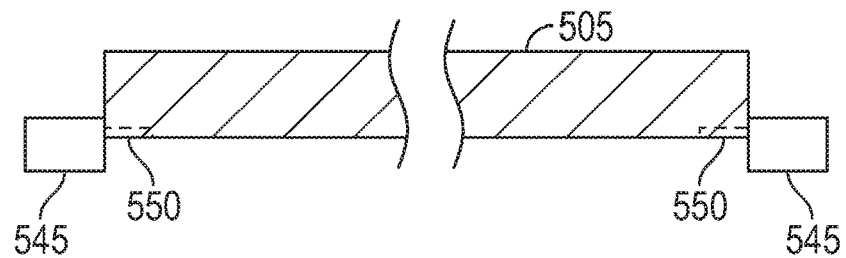
FIG. 5 is another illustration of a waveguide in accordance with some embodiments.

FIG. 5 is an illustration of another embodiment of a waveguide. The waveguide 505 includes a layer of conductive tape would around a waveguide core. The ends of the waveguide can be operatively connected to transceivers 545 and antennas 550 (e.g., patch antennas), sometimes referred to as waveguide launchers. The waveguide link can be used in establishing communication among servers in a server cluster or server farm.

Figure 6:
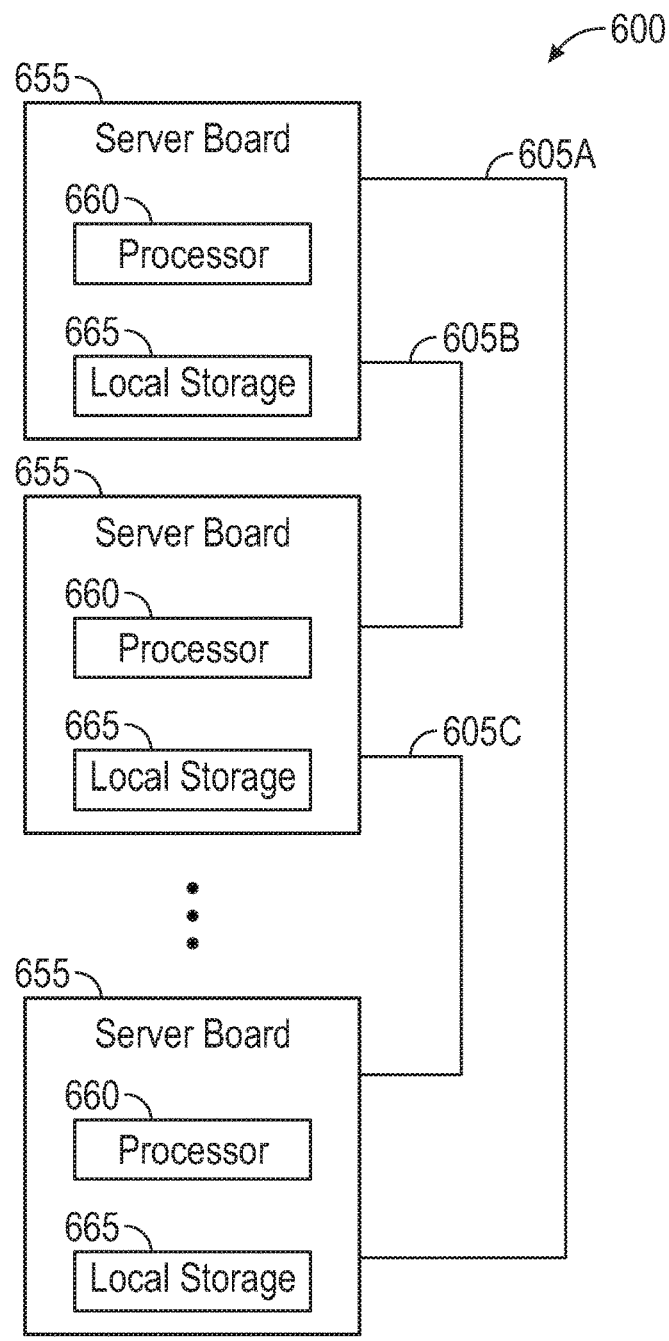
FIG. 6 is a block diagram of an electronic system in accordance with some embodiments.

FIG. 6 is a block diagram of an electronic system 600 incorporating waveguide assemblies in accordance with at least one embodiment of the invention. Electronic system 600 is merely one example in which embodiments of the present invention can be used. The electronic system 600 of FIG. 6 comprises multiple servers or server boards 655 interconnected as a server cluster that may provide internet cloud services. A server board 655 may include one or more processors 660 and local storage 665. Only three server boards are shown to simplify the example in the Figure. A server cluster may include hundreds of servers arranged on boards or server blades in a rack of servers, and a server cluster can include dozens of racks of server blades. Racks can be placed side-by-side with a back-plane or back-panel used to interconnect the racks. Server switching devices can be included in the racks of the server cluster to facilitate switching among the hundreds of servers.

The server boards in FIG. 6 are shown interconnected using waveguides 605A, 605B, and 605C, although an actual system would include hundreds of rack-to-rack and within rack interconnections. The waveguides are operatively connected to ports of the servers. There can be multiple levels of interconnect between servers. These levels can include within server blade interconnect, within server rack interconnect, rack-to-rack interconnect and rack-to-switch interconnect. The waveguides 605A, 605B, and 605C are used for at least a portion of the interconnect within the server system, and can be used for any of the within server blade, within server rack, rack-to-rack, and rack-to-switch interconnections. In certain embodiments, the waveguides form at least a portion of back-panel interconnections for a server cluster.

Figure 7:
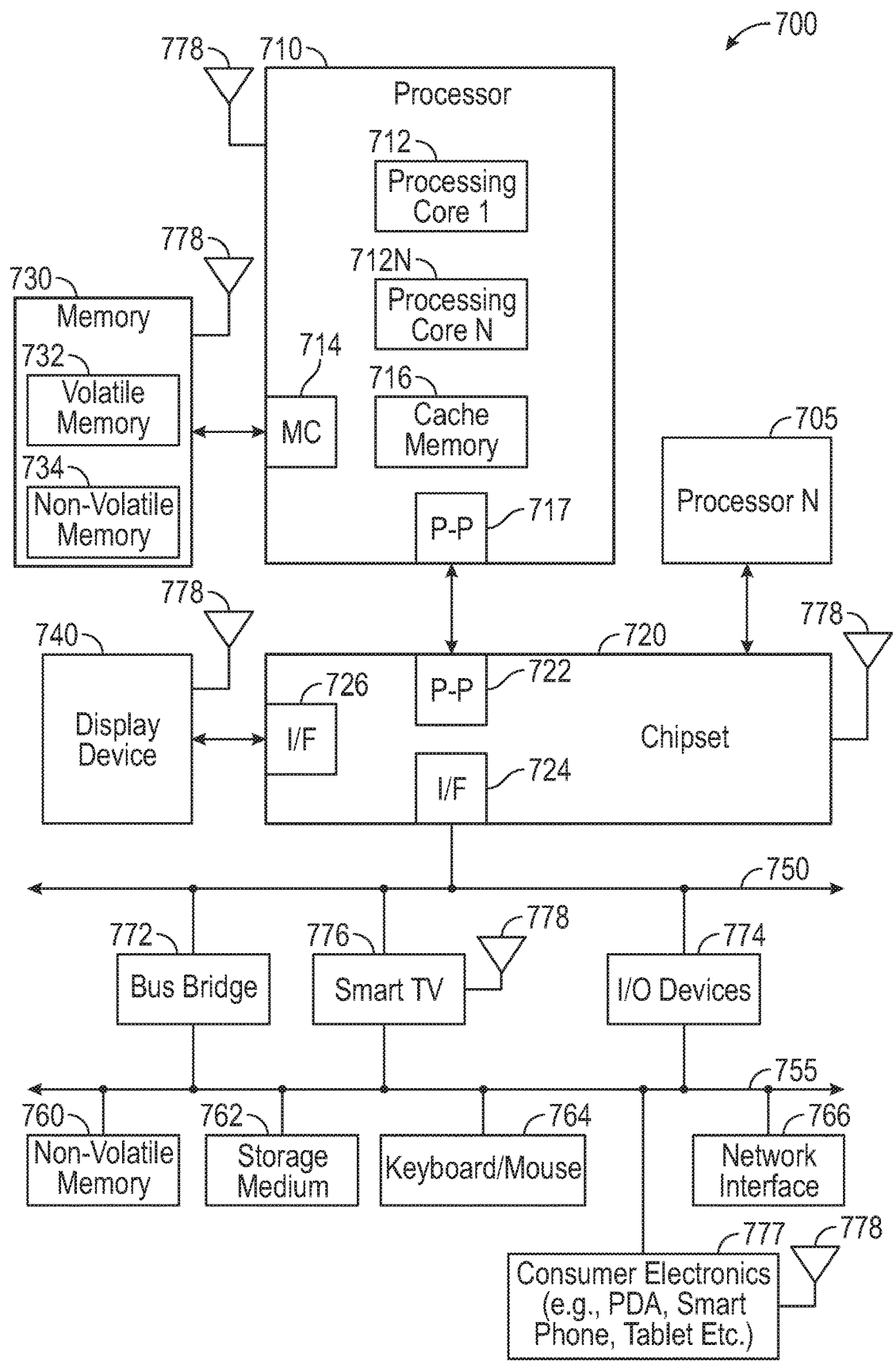
FIG. 7 is an illustration of another electronic system in accordance with some embodiments.

FIG. 7 illustrates a system level diagram, according to one embodiment of the invention. For instance, FIG. 7 depicts an example of an electronic device (e.g., system) that can include the waveguide interconnections as described in the present disclosure. In one embodiment, system 700 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 700 is a system on a chip (SOC) system. In one example two or more systems, as shown in FIG. 7 may be coupled together using one or more waveguides as described in the present disclosure. In one specific example, one or more waveguides as described in the present disclosure may implement one or more of busses 750 and 755.

In one embodiment, processor 710 has one or more processing cores 712 and 712N, where 712N represents the Nth processor core inside processor 710 where N is a positive integer. In one embodiment, system 700 includes multiple processors including 710 and 705, where processor 705 has logic similar or identical to the logic of processor 710. In some embodiments, processing core 712 includes, but is not limited to, pre-fetch logic to fetch instructions, decode logic to decode the instructions, execution logic to execute instructions and the like. In some embodiments, processor 710 has a cache memory 716 to cache instructions and/or data for system 700. Cache memory 716 may be organized into a hierarchal structure including one or more levels of cache memory.

In some embodiments, processor 710 includes a memory controller 714, which is operable to perform functions that enable the processor 710 to access and communicate with memory 730 that includes a volatile memory 732 and/or a non-volatile memory 734. In some embodiments, processor 710 is coupled with memory 730 and chipset 720. Processor 710 may also be coupled to a wireless antenna 778 to communicate with any device configured to transmit and/or receive wireless signals. In one embodiment, the wireless antenna interface 778 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 732 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 734 includes, but is not limited to, flash memory, phase change memory (PCM), read-only memory (ROM), electrically erasable programmable read-only memory (EEPROM), or any other type of non-volatile memory device.

Memory 730 stores information and instructions to be executed by processor 710. In one embodiment, memory 730 may also store temporary variables or other intermediate information while processor 710 is executing instructions. In the illustrated embodiment, chipset 720 connects with processor 710 via Point-to-Point (PtP or P-P) interfaces 717 and 722. Chipset 720 enables processor 710 to connect to other elements in system 600. In some embodiments of the invention, interfaces 717 and 722 operate in accordance with a PtP communication protocol such as the Intel® QuickPath Interconnect (QPI) or the like. In other embodiments, a different interconnect may be used.

In some embodiments, chipset 720 is operable to communicate with processor 710, 705N, display device 740, and other devices 772, 776, 774, 760, 762, 764, 766, 777, etc. Buses 750 and 755 may be interconnected together via a bus bridge 772. Chipset 720 connects to one or more buses 750 and 755 that interconnect various elements 774, 760, 762, 764, and 766. Chipset 720 may also be coupled to a wireless antenna 778 to communicate with any device configured to transmit and/or receive wireless signals. Chipset 720 connects to display device 740 via interface 726. Display 740 may be, for example, a liquid crystal display (LCD), a plasma display, cathode ray tube (CRT) display, or any other form of visual display device. In some embodiments of the invention, processor 710 and chipset 720 are merged into a single SOC. In one embodiment, chipset 720 couples with a non-volatile memory 760, a mass storage device(s) 762, a keyboard/mouse 764, and a network interface 766 via interface 724 and/or 704, smart TV 776, consumer electronics 777, etc.

In one embodiment, mass storage device 762 includes, but is not limited to, a solid state drive, a hard disk drive, a universal serial bus flash memory drive, or any other form of computer data storage medium. In one embodiment, network interface 766 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 7 are depicted as separate blocks within the system 700, the functions performed by some of these blocks may be integrated within a single semiconductor circuit or may be implemented using two or more separate integrated circuits. For example, although cache memory 716 is depicted as a separate block within processor 710, cache memory 716 (or selected aspects of 716) can be incorporated into processor core 712.

ADDITIONAL DESCRIPTION AND EXAMPLES

Example 1 can include subject matter (such as a method of making a waveguide) comprising forming an elongate waveguide core including a dielectric material; and arranging a conductive sheet around an outside surface of e dielectric core to produce a conductive layer around the waveguide core.

In Example 2, the subject matter of Example 1 optionally includes dispensing conductive tape from a dispensing unit; and wrapping the conductive tape around an outside surface of the waveguide core to form the conductive sheet.

In Example 3, the subject matter of Example 2 optionally includes a waveguide core including a length having a center axis, wherein the wrapping the conductive tape around the outside surface of the waveguide core includes rotating one or both of the dielectric core and the dispensing unit about the center axis of the waveguide core, and moving the waveguide core relative to the dispensing unit in a direction along the center axis of the waveguide core as the conductive tape is dispensed.

In Example 4, the subject matter of one or both of Examples 2 and 3 optionally includes wrapping a conductive tape that includes an adhesive on at least one surface of the conductive tape.

In Example 5, the subject matter of one or any combination of Examples 1-4 optionally includes arranging a sleeve of conductive material over the waveguide core and shrink wrapping the sleeve of conductive material over the waveguide core.

In Example 6, the subject matter of one or any combination of Examples 1-5 optionally includes forming the waveguide core with a tubular shape having a hollow center.

In Example 7, the subject matter of one or any combination of Examples 1-6 optionally includes arranging a conductive sheet that includes a conductive polymer around the outside surface of the waveguide core.

In Example 8, the subject matter of one or any combination of Examples 1-7 optionally includes arranging a conductive sheet that includes a conductive polymer and a protective outer-coating around the outside surface of the waveguide core.

In Example 9, the subject matter of one or any combination of Examples 1-8 optionally includes arranging a metallic conductive sheet around the outside surface of the waveguide core.

In Example 10, the subject matter of Example 9 optionally includes arranging a braid of metallic ribbon around the metallic conductive sheet.

In Example 11, the subject matter of one or any combination of Examples 1-10 optionally includes forming the elongate waveguide core using at least one of polyethylene (PE), polytetrafluoroethylene (PTFE), perfluoroalkoxy alkanes (PFA), fluorinated ethylene propylene (FEP), polyvinylidene fluoride (PVDF), or ethylene-tetraflouroethylene (ETFE).

In Example 12, the subject matter of one or any combination of Examples 1-11 optionally includes forming multiple holes in the elongate waveguide core and etching away a portion of the elongate waveguide core to form a hollow center in the elongate waveguide core.

Example 13 can include subject matter (such as a method of making a waveguide) or can optionally be combined with one or any combination of Examples 1-12 to include such subject matter comprising forming an elongate waveguide core including a dielectric material; and applying a liquid including a conductive material to an outside surface of the waveguide core to produce a conductive layer around the waveguide core, wherein the applying the liquid includes one of: immersing the waveguide core into a container of the liquid including the conductive material, or drawing the waveguide core through the container of the liquid including the conductive material.

In Example 14, the subject matter of Example 13 optionally includes one of spraying the liquid including the conductive material onto the waveguide core, or brushing the liquid including the conductive material onto the waveguide core.

In Example 15, the subject matter of one or both of Examples 13 and 14 optionally includes applying a liquid including a conductive polymer onto the waveguide core.

In Example 16, the subject matter of one or any combination of Examples 13-15 optionally includes applying a liquid including a metal onto the waveguide core.

In Example 17, the subject matter of one or any combination of Examples 13-16 optionally includes applying a protective coating over the conductive layer.

In Example 18, the subject matter of one or any combination of Examples 13-17 optionally includes applying a primer coating to the waveguide core prior to the applying the liquid including the conductive material to the waveguide core.

In Example 19, the subject matter of one or any combination of Examples 13-18 optionally includes sintering the waveguide core and the conductive layer.

In Example 20, the subject matter of one or any combination of Examples 13-19 optionally includes forming the waveguide core with a tubular shape having a hollow center.

In Example 21, the subject matter of one or any combination of Examples 13-19 optionally includes forming the waveguide core with a tubular shape and having a center filled with the dielectric material.

Example 22 can include subject matter (such as an apparatus) or can optionally be combined with one or any combination of Examples 1-21 to include such subject matter comprising an elongate waveguide core including a dielectric material; and conductive tape wrapped around an outside surface of the waveguide core.

In Example 23, the subject matter of Example 22 can include a waveguide transceiver circuit operatively coupled to the waveguide.

In Example 24, the subject matter of one or both of Examples 22 and 23 can optionally include a braid of metallic ribbon around the conductive tape.

In Example 25, the subject matter of one or any combination of Examples 22-24 can optionally include conductive tape that includes a conductive polymer.

In Example 26, the subject matter of one or any combination of Examples 22-25 can optionally include a waveguide having a width less than two millimeters (2 mm) and a length more than one meter (1 m).

Example 27 includes subject matter (such as an apparatus) or can optionally be combined with one or any combination of Examples 1-26 to include such subject matter comprising a first server and a second server, wherein the first and second servers each include a plurality of ports; and a waveguide operatively coupled to a first port of the first server and a first port of the second server.

In Example 28, the subject matter of Example 27 optionally includes a waveguide operatively coupled to the first port of the first server using a first waveguide transceiver circuit and a first patch antenna, and wherein the waveguide is operatively coupled to the first port of the second server using a second waveguide transceiver circuit and a second patch antenna.

In Example 29, the subject matter of one or both of Examples 27 and 28 optionally includes a waveguide including an elongate waveguide core including a dielectric material; and conductive tape wrapped around an outside surface of the waveguide core.

In Example 30, the subject matter of Example 29 optionally includes conductive tape including a metallic foil tape.

These non-limiting examples can be combined in any permutation or combination.

These several Examples can be combined using any permutation or combination. The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of making a waveguide, the method comprising:
   forming an elongate waveguide core of a uniform dielectric material; and
   arranging a conductive sheet around an outside surface of the dielectric waveguide core to produce a conductive layer around the waveguide core, wherein the dielectric material is uniform in a direction orthogonal to a radial axis of the elongate waveguide core and extends to the conductive layer.

2. The method of claim 1, wherein arranging the conductive sheet includes: dispensing conductive tape from a dispensing unit; and wrapping the conductive tape around an outside surface of the waveguide core to form the conductive sheet.

3. The method of claim 2, wherein the waveguide core includes a length having a center axis, wherein the wrapping the conductive tape around the outside surface of the waveguide core includes rotating one or both of the dielectric core and the dispensing unit about the center axis of the waveguide core, and moving the waveguide core relative to the dispensing unit in a direction along the center axis of the waveguide core as the conductive tape is dispensed.

4. The method of claim 2, wherein wrapping the conductive tape around an outside surface of the waveguide core includes wrapping a conductive tape that includes an adhesive on at least one surface of the conductive tape.

5. The method of claim 1, wherein arranging the conductive sheet includes arranging a sleeve of conductive material over the waveguide core and shrink wrapping the sleeve of conductive material over the waveguide core.

6. The method of claim 1, wherein forming the waveguide core includes forming the waveguide core with a tubular shape having a hollow center.

7. The method of claim 1, wherein arranging the conductive sheet around the outside surface of the waveguide core includes arranging a conductive sheet that includes a conductive polymer around the outside surface of the waveguide core.

8. The method of claim 1, wherein arranging the conductive sheet around the outside surface of the waveguide core includes arranging a conductive sheet that includes a conductive polymer and a protective outer-coating around the outside surface of the waveguide core.

9. The method of claim 1, wherein arranging the conductive sheet around the outside surface of the waveguide core includes arranging a metallic conductive sheet around the outside surface of the waveguide core.

10. The method of claim 1, including arranging a braid of metallic ribbon around the metallic conductive sheet.

11. The method of claim 1, wherein forming an elongate waveguide core includes forming the elongate waveguide core using at least one of polyethylene (PE), polytetrafluoroethylene (PTFE), perfluoroalkoxy alkanes (PFA), fluorinated ethylene propylene (FEP), polyvinylidene fluoride (PVDF), liquid crystal polymer (LCP, or ethylene-tetraflouroethylene (ETFE).

12. The method of claim 1, wherein forming an elongate waveguide core includes forming multiple holes in the elongate waveguide core and etching away a portion of the elongate waveguide core to form a hollow center in the elongate waveguide core.

* * * * *

UNITED STATES PATENT AND TRADEMARK OFFICE
CERTIFICATE OF CORRECTION

PATENT NO. : 11,095,012 B2  
APPLICATION NO. : 16/329587  
DATED : August 17, 2021  
INVENTOR(S) : Aleksov et al.

Page 1 of 1

It is certified that error appears in the above-identified patent and that said Letters Patent is hereby corrected as shown below:

In the Claims

In Column 10, Line 52, in Claim 10, delete "claim 1," and insert --claim 9,-- therefor Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*